C. P. COLBURN.
BEVEL GEARING.
APPLICATION FILED DEC. 14, 1914.

1,160,975.

Patented Nov. 16, 1915.

Witnesses:

Inventor
Charles P. Colburn
By his Attorney

UNITED STATES PATENT OFFICE.

CHARLES P. COLBURN, OF NEW ROCHELLE, NEW YORK, ASSIGNOR TO H. W. JOHNS-MANVILLE COMPANY, A CORPORATION OF NEW YORK.

BEVEL-GEARING.

1,160,975.  Specification of Letters Patent.  Patented Nov. 16, 1915.

Application filed December 14, 1914. Serial No. 877,178.

*To all whom it may concern:*

Be it known that I, CHARLES P. COLBURN, a citizen of the United States of America, residing at New Rochelle, county of Westchester, State of New York, have invented certain new and useful Improvements in Bevel-Gearing, of which the following is a specification.

My invention relates to bevel gearing and has for its special purpose the production of sets of bevel gearing the elements of which will run perfectly true and properly spaced so as to produce engagement of the teeth of the gears exactly along the pitch lines, and to accomplish this without producing any end thrust upon the journal bearings of the gears.

The best method of applying my invention at present known to me is illustrated in the accompanying sheet of drawings in which—

Figure 1:
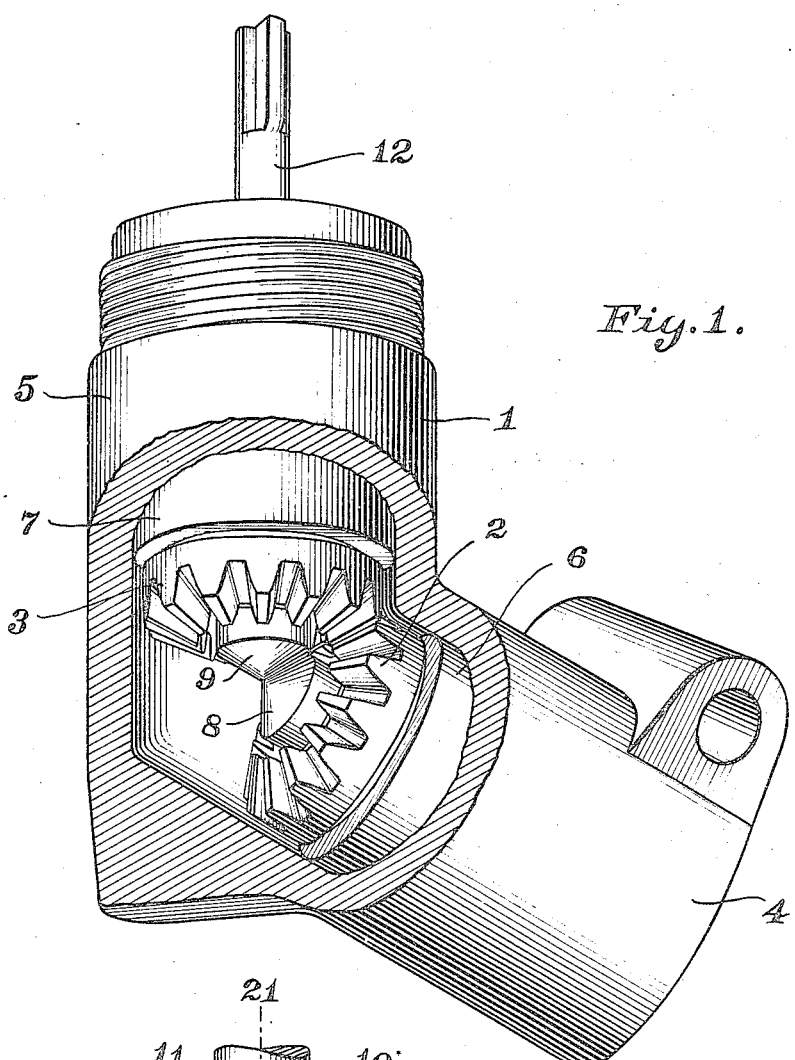
Figure 2:
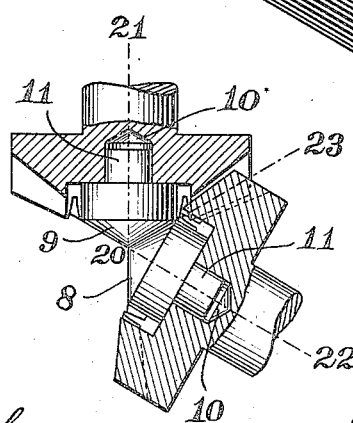

Figure 1 is a perspective view of a set of bevel gears and housing therefor with part of the housing broken away, and Fig. 2 is a detailed cross section of the bevel gears on the plane of their axes.

Throughout the drawings like reference characters indicate like parts.

1, is a housing such as would be usable in connection with speedometer driving mechanism.

2, is the lower bevel gear, and 3, the upper bevel gear. Lower gear 2, has a journal 6, mounted in journal bearing 4. Upper gear 3, has a journal 7, mounted in journal bearing 5, said journal bearings being formed in the housing 1.

The broken line 20—23, represents the common pitch line of the bevel teeth which are in engagement. The broken line 20—21, represents the axis of the upper gear wheel and 20—22, the axis of the lower gear wheel.

In order to produce the most efficient operation of the gears, the engagement between them should always take place along the common pitch line. To accomplish this by ordinary means, it requires very nice adjustment of the journal bearings for the wheels and provision for taking up end thrust thereof. According to my invention, I substitute for these devices two simple conical projections upon the adjacent faces of the gear wheels which projections have the axes of their cone surfaces coincident with the axes of the respective gears to which they are attached and have the elements of said cone surfaces coincident with the pitch lines of the gear teeth on said gear wheels. Preferably, these projections are formed by means of such structures as shown in the drawings, 8, being a cone-shaped stud having a rearwardly projecting pin 11, entering the counter-bore 10, in the lower gear 2, while 9, is a similar cone-shaped stud having a rearwardly extending pin 11, which is set in the counter-bore 10, of the upper gear wheel.

The bevel gears are, of course, connected usually to power transmitting shafts, one of which, 12, is shown in Fig. 1. Preferably, the surfaces of the studs or projections 8, and 9, are hardened as by case hardening. The cone surfaces of said projections should be hardened whether or not the other portions are thus treated.

In operation, the two cone surfaces of the projections 8, and 9, roll freely, one upon another, the common element of the two cone surfaces at the point of contact being in line with the pitch line of the teeth in contact. The theoretically correct relative position of the two gears is therefore maintained uniformly. All end thrust is taken up by these cone surfaces and to that extent the journal bearings and journals of the gear wheels are relieved from such end thrust. The gears may be made as at present and then counterbored at slight expense. The cone-shaped studs 8, and 9, can be turned out cheaply in quantity and inserted in the counter-bored gears at small expense. Thus all the careful work and fitting otherwise necessary for effecting the proper spacing of the gears by means of journal bearings is avoided by the use of my invention, and a better result is secured at less cost.

Having, therefore, described my invention, I claim:

1. The combination with two intermeshing bevel gears, and journal bearings for the same, of abutting projections from the centers of said bevel gears having cone-shaped faces meeting at the apices of the cones and along a common element of the two cone surfaces.

2. The combination with two intermeshing bevel gears, and journal bearings for the same, of abutting projections from the centers of said bevel gears having cone-shaped faces meeting at the apices of the cones and along a common element of the two cone surfaces, said projections being formed of cone-shaped pins set in the gear wheels and having their cone faces hardened.

3. A bevel gear wheel having a cone-shaped projection on its outer face, the axis of the cone being coincident with the axis of the wheel, and the elements of the cone surface being coincident with the pitch lines of the bevel gear teeth.

4. A bevel gear wheel having a cone-shaped projection on its outer face, the axis of the cone being coincident with the axis of the wheel, and the elements of the cone surface being coincident with the pitch lines of the bevel gear teeth, said projections being formed of pins set in the gear wheels and having their cone faces hardened.

CHAS. P. COLBURN.

Witnesses:
WILLIAM J. STERLING,
ELMER E. GIBSON.